(12) United States Patent
Kobayashi et al.

(10) Patent No.: US 7,310,449 B2
(45) Date of Patent: Dec. 18, 2007

(54) IMAGE PROCESSING SYSTEM, PROJECTOR, COMPUTER-READABLE MEDIUM AND IMAGE PROCESSING METHOD

(75) Inventors: Masanobu Kobayashi, Shiojiri (JP); Osamu Wada, Ina (JP)

(73) Assignee: Seiko Epson Corporation, Tokyo (JP)

( * ) Notice: Subject to any disclaimer, the term of this patent is extended or adjusted under 35 U.S.C. 154(b) by 703 days.

(21) Appl. No.: 10/757,451

(22) Filed: Jan. 15, 2004

(65) Prior Publication Data

US 2005/0078227 A1    Apr. 14, 2005

(30) Foreign Application Priority Data

Jan. 22, 2003    (JP) .............................. 2003-013280

(51) Int. Cl.
 *G06K 9/40*     (2006.01)
 *H04N 3/22*     (2006.01)
 *H04N 3/26*     (2006.01)

(52) U.S. Cl. ....................................... 382/274; 348/745
(58) Field of Classification Search ................. 353/31; 348/745; 382/274
See application file for complete search history.

(56) References Cited

U.S. PATENT DOCUMENTS

| | | | | |
|---|---|---|---|---|
| 5,298,985 A * | 3/1994 | Tsujihara et al. | ............ | 348/745 |
| 5,905,541 A * | 5/1999 | Yun | ............ | 348/687 |
| 6,118,113 A * | 9/2000 | Hibbard et al. | ............ | 250/205 |
| 7,110,002 B2 * | 9/2006 | Wada | ............ | 345/600 |
| 2002/0054275 A1 * | 5/2002 | Yamanaka | ............ | 353/30 |
| 2003/0081181 A1 * | 5/2003 | Noguchi | ............ | 353/31 |

FOREIGN PATENT DOCUMENTS

| | | |
|---|---|---|
| EP | A 0402137 | 12/1990 |
| EP | A 0757498 | 2/1997 |
| JP | A 05-323892 | 12/1993 |
| JP | A 07-064522 | 3/1995 |
| JP | A 07-184231 | 7/1995 |
| JP | A 09-107515 | 4/1997 |
| JP | A 09-138673 | 5/1997 |
| JP | A 2001-350426 | 12/2001 |

* cited by examiner

*Primary Examiner*—Jingge Wu
*Assistant Examiner*—Max Shikhman
(74) *Attorney, Agent, or Firm*—Oliff & Berridge, PLC

(57) ABSTRACT

An image processing system enabling luminance regulation depending on displayed images is provided by a projector, the projector including: a signal input section which input an image signal; a signal output section which outputs a corrected image signal; an image projecting section; a correction table storage section which stores a correction table showing the relationship between a correction amount and a position in an image; an instruction input section which inputs instruction information representing a correction instruction from a user; and a luminance regulating section which corrects a luminance value of the input image signal to make a luminance value in a central portion of an image lower than the current luminance value of the center portion when uniformity improvement of luminance values in central and marginal portions of the image is desired, or corrects that to make a luminance value in a marginal portion of an image lower than the current luminance value of the marginal portion when emphasis of a central portion of the image is desired, based on the correction table and the instruction information.

9 Claims, 8 Drawing Sheets

IMAGE PROCESSING SYSTEM, PROJECTOR, COMPUTER-READABLE MEDIUM AND IMAGE PROCESSING METHOD

Japanese Patent Application No. 2003-13280, filed on Jan. 22, 2003, is hereby incorporated by reference in its entirety.

BACKGROUND OF THE INVENTION

The present invention relates to an image processing system, projector, program, information storage medium and image processing method which can regulate the luminance value of an image.

In recent years, image display devices such as a projector and the like have been designed to regulate the color and brightness of a displayed image depending on its display contents provided by a movie, game, PC (Personal Computer) or the like.

In such image display devices, the whole image is corrected uniformly.

In fact, however, an appropriate image cannot be displayed by uniformly correcting the whole image since the luminance value in the marginal portion of the displayed image is reduced depending on the properties of light source and projection lens.

For example, Japanese Patent Application No. Hei 4-134914 (Japanese Patent Application Laid-Open No. Hei 5-323892) discloses a uniformity circuit for overcoming such a problem. The uniformity circuit is designed to modulate R, G and B primary color video signals by the use of uneven-color correcting wave-shaped signals, thereby controlling R, G and B beam amperages flowing in CRT to control the luminance output on the CRT phosphor screen. This provides uniform R, G and B illumination distributions on the screen.

However, this uniformity circuit can only suppress the reduction of luminance in the marginal image portion as the result of uneven-color correction. This Japanese Patent Application discloses no concrete technique of correcting the uneven color for suppressing the reduction of luminance in the marginal image portion.

Moreover, it cannot be said that the complete correction of uneven color directly improves the image quality. It is important that the image is regulated depending on the displayed contents, rather than the correction.

BRIEF SUMMARY OF THE INVENTION

In view of the aforementioned problem, the present invention is made and may provide an image processing system, projector, program, information storage medium and image processing method enabling luminance regulation depending on displayed images.

According to a first aspect of the present invention, there is provided an image processing system comprising:

signal input means for inputting an image signal;

luminance regulating means for regulating a luminance value of an image by correcting the inputted image signal;

signal output means for outputting the corrected image signal; and instruction input means for inputting instruction information which represents a correction instruction from a user, wherein the luminance regulating means corrects the image signal to lower a luminance value in a central portion of an image when uniformity improvement of luminance values in central and marginal portions of the image is instructed, or corrects the image signal to lower a luminance value in a marginal portion of an image when emphasis of a central portion of the image is instructed, based on the instruction information and a correction table showing the relationship between a correction amount and a position in an image.

According to a second aspect of the present invention, there is provided an image processing system comprising:

signal input section which inputs an image signal;

luminance regulating section which regulates a luminance value of an image by correcting the inputted image signal;

signal output section which outputs the corrected image signal; and instruction input section which inputs instruction information which represents a correction instruction from a user, wherein the luminance regulating section corrects the image signal to equalize luminance values in central and marginal portions of an image when the luminance value in the central portion is higher than the luminance value in the marginal portion, based on the instruction information and a correction table showing the relationship between a correction amount and a position in an image.

According to a third aspect of the present invention, there is provided a projector comprising:

signal input means for inputting an image signal;

luminance regulating means for regulating a luminance value of an image by correcting the inputted image signal;

signal output means for outputting the corrected image signal;

instruction input means for inputting instruction information which represents a correction instruction from a user; and image projecting means for projecting an image based on the image signal output from the signal output means, wherein the luminance regulating means corrects the image signal to lower a luminance value in a central portion of an image when uniformity improvement of luminance values in central and marginal portions of the image is instructed, or corrects the image signal to lower a luminance value in a marginal portion of an image when emphasis of a central portion of the image is instructed, based on the instruction information and a correction table showing the relationship between a correction amount and a position in an image.

According to a fourth aspect of the present invention, there is provided a projector comprising:

signal input section which inputs an image signal;

luminance regulating section which regulates a luminance value of an image by correcting the inputted image signal;

signal output section which outputs the corrected image signal;

instruction input section which inputs instruction information which represents a correction instruction from a user; and image projecting section which projects an image based on the image signal output from the signal output section, wherein the luminance regulating section corrects the image signal to equalize luminance values in central and marginal portions of an image when the luminance value in the central portion is higher than the luminance value in the marginal portion, based on the instruction information and a correction table showing the relationship between a correction amount and a position in an image.

According to a fifth aspect of the present invention, there is provided a computer-readable program causing a computer to function as:

signal input means for inputting an image signal;

luminance regulating means for regulating a luminance value of an image by correcting the inputted image signal;

signal output means for outputting the corrected image signal; and instruction input means for inputting instruction information which represents a correction instruction from a user, wherein the luminance regulating means corrects the image signal to lower a luminance value in a central portion of an image when uniformity improvement of luminance values in central and marginal portions of the image is instructed, or corrects the image signal to lower a luminance value in a marginal portion of an image when emphasis of a central portion of the image is instructed, based on the instruction information and a correction table showing the relationship between a correction amount and a position in an image.

According to a sixth aspect of the present invention, there is provided a computer-readable information storage medium storing the above-described program.

According to a seventh aspect of the present invention, there is provided an image processing method comprising:

inputting instruction information representing a correction instruction from a user;

inputting an image signal;

correcting the image signal to lower a luminance value in a central portion of an image when uniformity improvement of luminance values in central and marginal portions of the image is instructed, or correcting the image signal to lower a luminance value in a marginal portion of an image when emphasis of the central portion of the image is instructed, based on the instruction information and a correction table showing the relationship between a correction amount and a position in an image; and outputting the corrected image signal.

The image processing system and others according to the present invention can perform luminance regulation depending on the displayed images by controlling and equalizing the luminance values of the whole image based on a correction table showing the relationship between a correction amount and a position in an image.

Moreover, the image processing system and others of the invention can output a desired image by correcting image signals to make luminance values in a central portion of an image lower than the current luminance values of the center portion when uniformity improvement of luminance values in central and marginal portions of the image is instructed by a user, or by correcting the image signals to make luminance values in a marginal portion of an image lower than the current luminance values of the marginal portion when emphasis of a central portion of the image is instructed by a user.

According to an eighth aspect of the present invention, there is provided an image processing system comprising:

signal input means for inputting an image signal;

luminance regulating means for regulating a luminance value of an image by correcting the inputted image signal;

signal output means for outputting the corrected image signal; and luminance measurement means for measuring a luminance value of an image and outputting luminance information, wherein the luminance regulating means corrects the image signal to equalize luminance values in central and marginal portions of an image when the luminance value in the central portion is higher than the luminance value in the marginal portion, based on the luminance information and a correction table showing the relationship between a correction amount and a position in an image.

According to a ninth aspect of the present invention, there is provided a projector comprising:

signal input means for inputting an image signal;

luminance regulating means for regulating a luminance value of an image by correcting the inputted image signal;

signal output means for outputting the corrected image signal;

luminance measurement means for measuring a luminance value of an image and outputting luminance information; and image projecting means for projecting an image based on the image signal output from the signal output means, wherein the luminance regulating means corrects the image signal to equalize luminance values in central and marginal portions of an image when the luminance value in the central portion is higher than the luminance value in the marginal portion, based on the luminance information and a correction table showing the relationship between a correction amount and a position in an image.

According to a tenth aspect of the present invention, there is provided a computer-readable program causing a computer to function as:

signal input means for inputting an image signal;

luminance regulating means for regulating a luminance value of an image by correcting the inputted image signal;

signal output means for outputting the corrected image signal; and luminance measurement means for measuring a luminance value of an image and outputting luminance information, wherein the luminance regulating means corrects the image signal to equalize luminance values in central and marginal portions of an image when the luminance value in the central portion is higher than the luminance value in the marginal portion, based on the luminance information and a correction table showing the relationship between a correction amount and a position in an image.

According to an eleventh aspect of the present invention, there is provided an image processing method comprising:

measuring a luminance value of a displayed image and outputting luminance information;

inputting an image signal;

correcting the image signal to equalize luminance values in central and marginal portions of an image when the luminance value in the central portion is higher than the luminance value in the marginal portion, based on the luminance information and a correction table showing the relationship between a correction amount and a position in an image.; and outputting the corrected image signal.

The image processing system and others according to the present invention can perform luminance regulation depending on the displayed images by controlling and equalizing the luminance values of the whole image based on a correction table showing the relationship between a correction amount and a position in an image.

Furthermore, the image processing system and others of the invention can output an image adapted to the viewing environment by measuring luminance values of an actually displayed image and regulating them according to the measurement.

In the above image processing system, projector, program, information storage medium and image processing method, the correction table may include data showing the correction amount based on a value obtained by dividing a differential value between a darkroom reference luminance value at a given position in an image and the minimum luminance value of the image by a differential value between the maximum and minimum luminance values of the image.

Thus, the image processing system and others can regulate luminance values according to the luminance distribution of an image.

In the above image processing system, projector, program, information storage medium and image processing method, the correction amount may be obtained by: {(the darkroom reference luminance value−the minimum luminance value)/the darkroom reference luminance value}/{(the maximum luminance value−the minimum luminance value)/the maximum luminance value}.

The image processing system and others can be normalized by using a value obtained by dividing a differential value between a darkroom reference luminance value and the minimum luminance value by the darkroom reference luminance value, and a value obtained by dividing a differential value between the maximum and minimum luminance values by the maximum luminance value. Therefore, the luminance values can be more adequately regulated according to the luminance distribution of an image.

DETAILED DESCRIPTION OF THE EMBODIMENT

Figure 1:
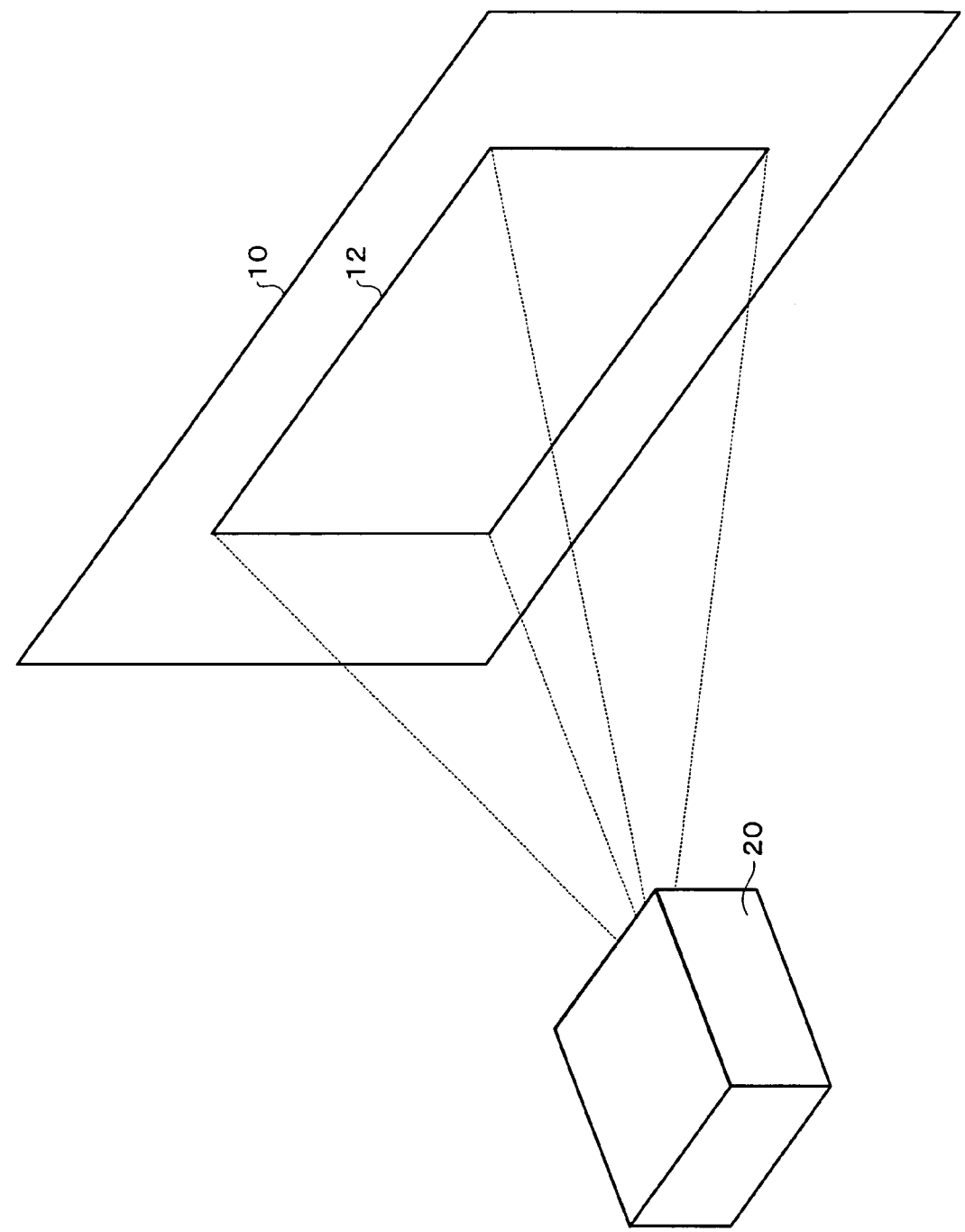
FIG. 1 schematically shows a state when an image is projected.

The present invention will now be described in connection with a projector which will function as an image processing system for regulating the luminance value in each of the pixels forming an image with reference with the drawing. An embodiment which will be described is not intended to limit the subject matter of the invention as described in the accompanying claims. Furthermore, it is to be understood that all the components shown in such an embodiment is not necessarily essential for practicing the invention defined by the accompanying claims.

Entire System

FIG. 1 shows a state when an image is projected.

Referring to FIG. 1, a projector 20 is generally disposed in the front of a screen region 10 and designed to project an image onto a projection area 12.

Figure 2:
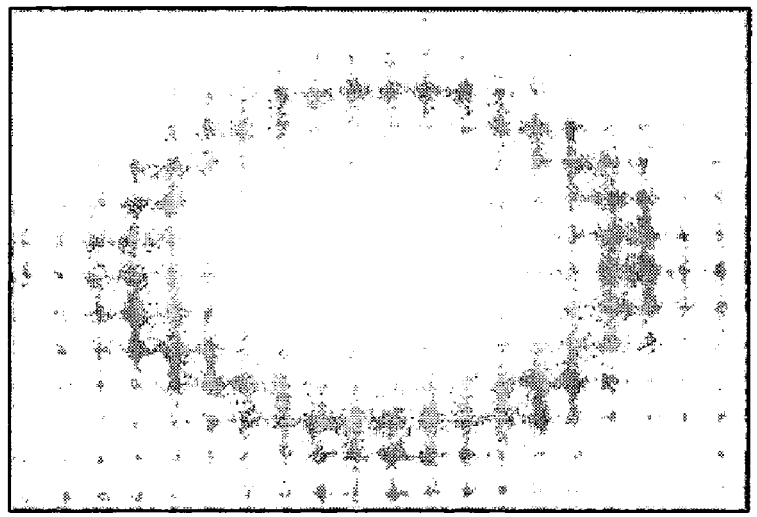
FIG. 2 shows an image projected by a projector based on image signals which represent an image having a uniform color as a whole.
Figure 3:
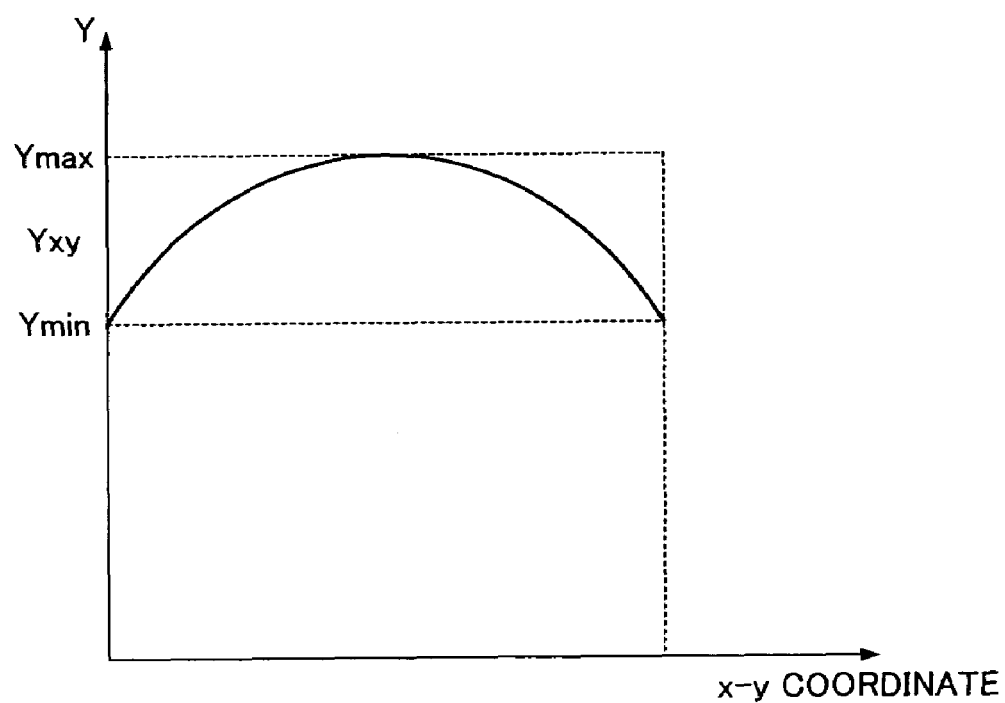
FIG. 3 is a graph schematically showing luminance distribution of an image before correction.

FIG. 2 shows an image projected by a projector based on image signals which represent an image having its uniform color as a whole. FIG. 3 is a graph schematically showing luminance distribution in an image before correction.

When the projector 20 projects a uniform image having its uniform color as a whole in such a state as shown in FIG. 1, the projected image has its central portion (i.e., the intermediate portion in the x-y coordinate) having a luminance value Y higher than that of its marginal portions (i.e., the start and end portions in the x-y coordinate), as shown in FIGS. 2 and 3. This is because the projected image is influenced by the projection lens and light source of the projector 20.

The x-y coordinate actually includes x and y coordinate axes, but they are schematically represented by a single axis in this embodiment for simplification.

Figure 4:
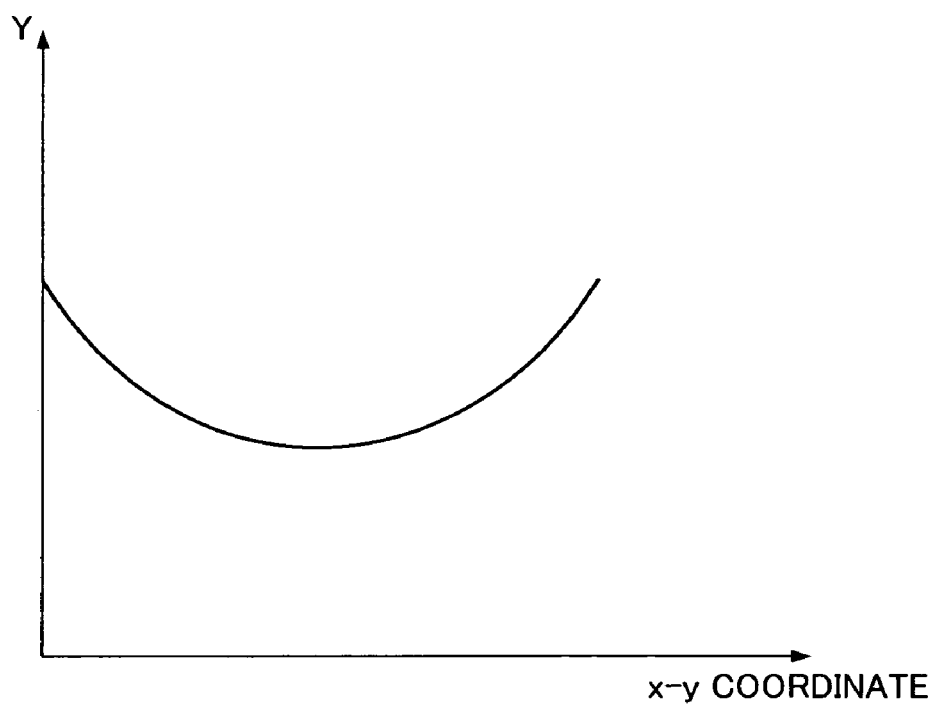
FIG. 4 is a graph schematically showing a correction amount of an image in relation to an x-y coordinate position.

FIG. 4 is a graph schematically showing a correction amount of an image in relation to an x-y coordinate position.

The luminance values Y in a central portion of an image are higher than those in a marginal portion as shown in FIG. 3. In this embodiment, the correction is performed so that the luminance values Y in the central portion are lower than those in the marginal portion as shown in FIG. 4, in opposition to FIG. 3. Therefore, the luminance values in a corrected image are substantially equalized independent of the x-y coordinate position.

In such a manner, the projector 20 of this embodiment can project the image with its uniform luminance value and without depending on the position of the image, such that the uneven luminance and color thereof can be reduced.

Functional Blocks

The functional blocks of a projector 20 for implementing such a feature will be described blow.

Figure 5:
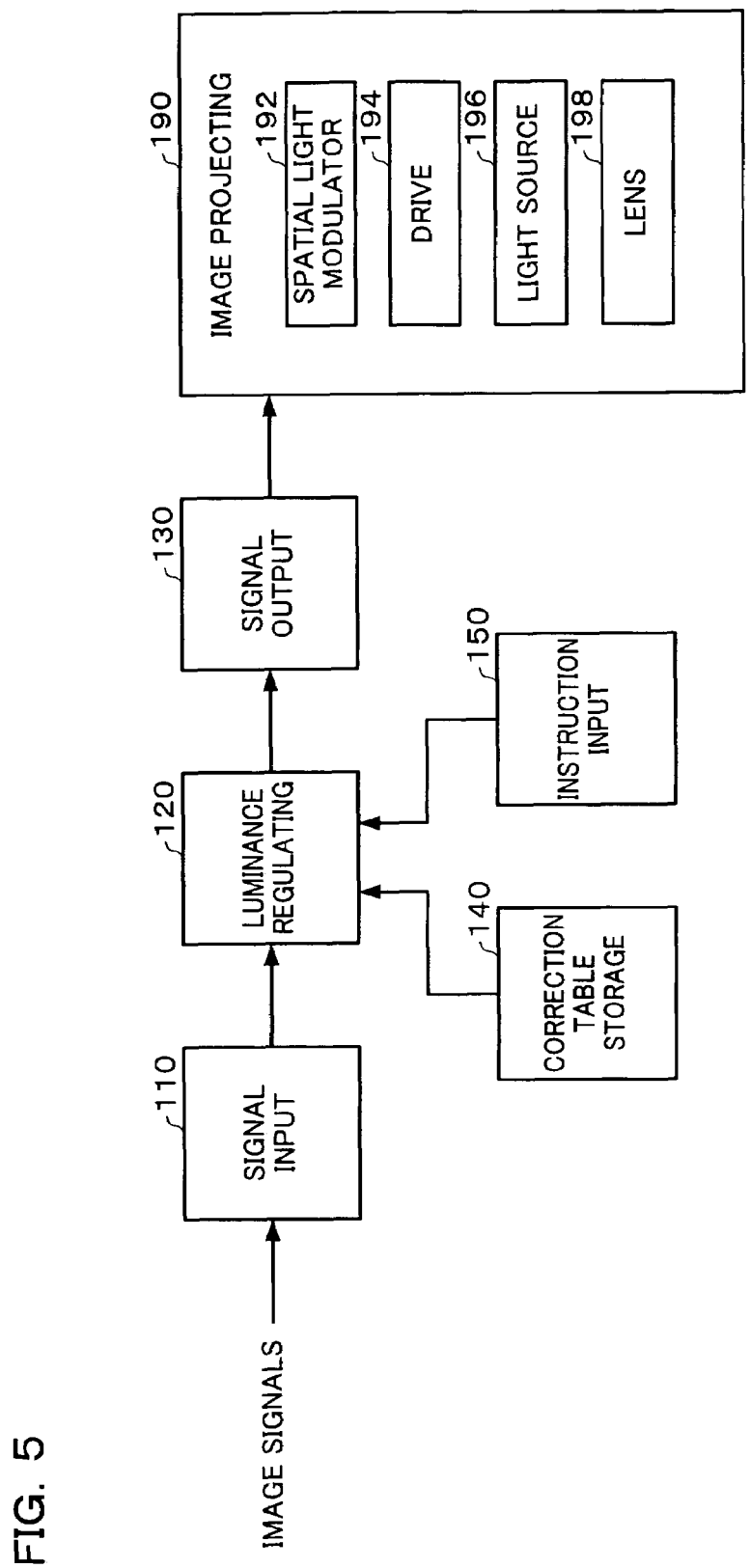
FIG. 5 is a functional block diagram showing a projector according to one embodiment of the present invention.

FIG. 5 is a functional block diagram showing the projector 20 according to one embodiment of the present invention.

The projector 20 includes a signal input section 110 for inputting image signals, a luminance regulating section 120 for correcting the inputted image signals so that the luminance value of the image will be regulated, a signal output section 130 for outputting the corrected image signals, a correction table storage section 140 for storing a correction table showing the relationship between a correction amount and a position in an image, an instruction input section 150 for inputting instruction information which represents a correction instruction from a user, and an image projecting section 190 for projecting an image based on the image signals from the signal output section 130.

The luminance regulating section 120 corrects image signals to make luminance values in a central portion of an image lower than the current luminance values of the center portion when uniformity improvement of luminance values in central and marginal portions of the image is instructed, or corrects the image signals to make luminance values in a marginal portion of an image lower than the current luminance values of the marginal portion when emphasis of a central portion of the image is instructed.

The correction table will now be described.

Figure 6:
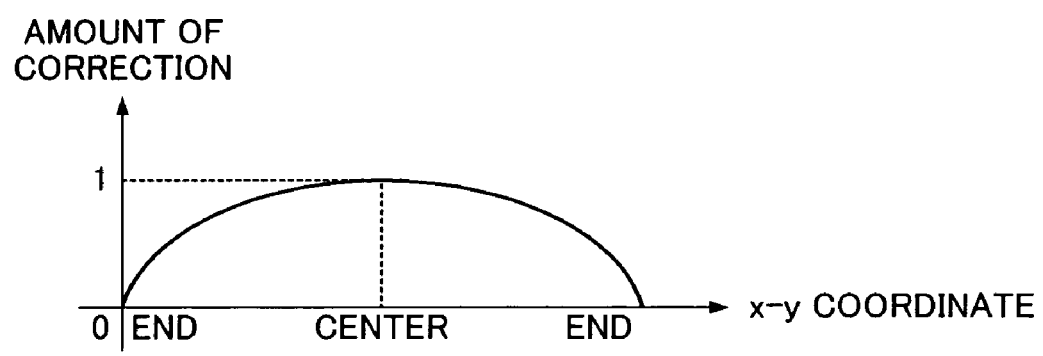
FIG. 6 is a schematic correction table according to one embodiment of the present invention.

FIG. 6 is a schematic correction table according to one embodiment of the present invention.

If the luminance value in the central image portion is higher than that of the marginal image portion as shown in FIG. 2, the luminance regulating section 120 regulates the luminance value so that the amount of correction for luminance value in the central image portion is more than that in the marginal image portions (or end portions), as shown in FIG. 6. For such a reason, the correction table is designed to associate the x-y coordinate indicating a position in an image with a correction amount at the position.

Thus, the luminance regulating section 120 can correct to reduce a differential luminance between the central and marginal image portions by regulating the luminance value based on the correction table.

The image projecting section 190 includes a spatial light modulator 192, a drive portion 194 for driving the spatial light modulator 192, a light source 196 and a lens 198.

The drive portion 194 is operative to drive the spatial light modulator 192 based on the image signals from the signal output section 130. And, the image projecting unit 190 projects the light from the light source 196 through the spatial light modulator 192 and lens 198. If the light source 196 is in the form of a point light source, the luminance distribution in the image is clearer.

The hardware components for implementing the sections of the projector 20 can be accomplished by the following components, for example.

Figure 7:
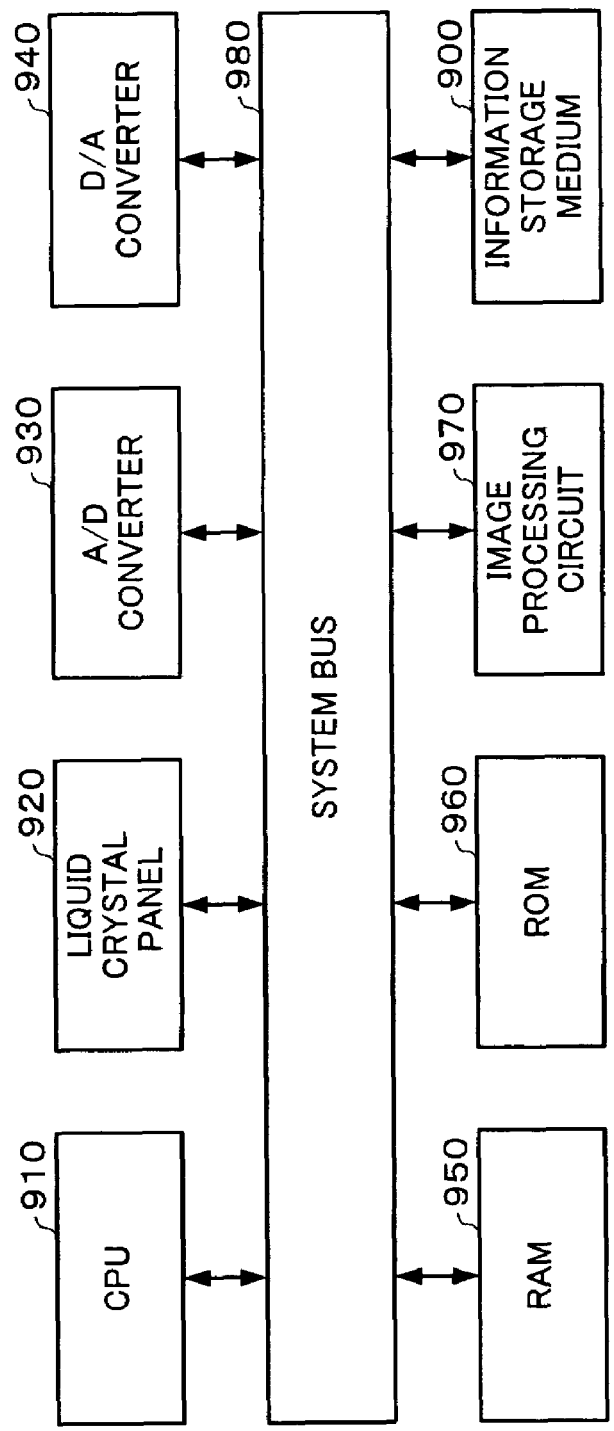
FIG. 7 is a block diagram showing hardware configuration of a projector according to one embodiment of the present invention.

FIG. 7 is a block diagram showing hardware configuration of the projector 20 according to one embodiment of the present invention.

For example, the signal input section 110 is implemented by an A/D converter 930; the correction table storage section 140 is implemented by a RAM 950; the luminance regulating section 120 is implemented by an image processing circuit 970, RAM950, and CPU 910; the signal output section 130 is implemented by a D/A converter 940; the spatial light modulator 192 is implemented by a liquid crystal panel 920, and a ROM 960 for storing a liquid crystal light valve driver for driving the liquid crystal panel 920.

These sections can be configured to mutually deliver information therebetween through a system bus 980.

Moreover, these sections may be implemented in a hardware manner like a circuit, or in a software manner like a driver.

Furthermore, the functions of the luminance-distribution analyzing section 160 and others sections may be implemented by a computer according to a program read out from an information storage medium 900, which program is designed to cause the computer to function as the luminance-distribution analyzing section 160 and other sections.

Such an information storage medium 900 may be accomplished, for example, by CD-ROM, DVD-ROM, ROM, RAM, HDD or the like through either of the contact or non-contact type reading mode.

Rather than the information storage medium 900, the aforementioned functions can be implemented by downloading a program or the like for implementing them from a host device or the like through a transmission channel.

Next, the flow of image processing by use of these parts will be described.

First of all, a user activates the projector 20 which in turn projects a single-color calibration image based on image signals representing a uniform image (i.e., an image having its uniform color). The user then sets a luminance regulating parameter P by operating a remote controller or buttons on the main body of the projector 20 while viewing the displayed calibration image.

The instruction input section 150 inputs the luminance regulating parameter P as instruction information indicating a correction instruction. The luminance regulating parameter P may be applied as any integer value between −100 and 100, for example. In this case, P=0 is the normal state, wherein the luminance value in the central image portion is slightly higher than that in the marginal image portion. If P is a negative value, the luminance value in the central image portion is lower than the normal value. If P is a positive value, the luminance value in the marginal image portion is lower than the normal value.

The luminance regulating section 120 computes an amount of regulation for each image signal at the respective one of the x-y coordinates within the image, based on the correction table stored in the correction table storage section 140 and the instruction information from the instruction input section 150.

For example, the correction table may include data indicating a correction amount for each x-y coordinate based on a value obtained by dividing a differential value between a darkroom reference luminance value Yxy in the coordinate position and the minimum luminance value Ymin in the image by a differential value between the maximum and minimum luminance values (Ymax, Ymin) in the image.

For example, if the amount of correction for each x-y coordinate is ADJxy, the correction table is determined according to the following equation.

$$ADJxy = \{(Yxy-Ymin)/Yxy\}/\{(Ymax-Ymin)/Ymax\}$$

In this case, the luminance regulating section 120 calculates color information RGB'xy after the luminance regulation from color information RGBxy before the luminance regulation for each x-y coordinate, when P is less than zero (i.e., when the luminance values in a central portion of an image are lower than the normal values), using the following equation.

$$RGB'xy = RGBxy * \{1 - ADJxy*(|P|/100)\}$$

The luminance regulating section 120 calculates the color information RGB'xy after the luminance regulation from the color information RGBxy before the luminance regulation for each x-y coordinate, when P is equal to or higher than zero (i.e., when the luminance values in the marginal portion are lower than the normal values), using the following equation.

$$RGB'xy = RGBxy * \{1 - (1 - ADJxy)*(P/100)\}$$

The signal output section 130 converts the digital color information RGB'xy after the luminance has been regulated into analog image signals, and the image projecting section 190 projects an image with its regulated luminance value, based on the image signals.

If the displayed image has an appropriate luminance distribution, the user terminates the regulation. If it is not appropriate, the user again changes the parameter.

As described, the projector 20 according to this embodiment can equalize the luminance value in the whole image and regulate the luminance value depending on the displayed image, by regulating the luminance value based on a correction table for showing the position of the displayed image and an amount of correction at this position.

The projector 20 can also output a desired image by regulating the luminance values depending on user's instructions for correction.

Moreover, the projector 20 can normalize the luminance values by using a value obtained by dividing a differential value between a darkroom reference luminance value and the minimum luminance value by the darkroom reference luminance value, and a value obtained by dividing a differential value between the maximum and minimum luminance values by the maximum luminance value. Therefore, the luminance values can be more adequately regulated by using luminance distribution in an image according to the contents of displayed images.

Modifications

Although the embodiment of the present invention has been described, the present invention is not limited to the aforementioned embodiment.

Although the above embodiment has been described as to an image having the maximum luminance value at its central portion, the present invention is not limited to such an image, but may similarly be applied to images having various other luminance distributions.

Although the embodiment has been described as to the projector 20 which is disposed in front of the screen region 10, the projector 20 may be disposed slantwise relative to the screen region 10, for example. In this case, the luminance distribution will be deviated. The present invention is also effective for such a case.

Figure 8:
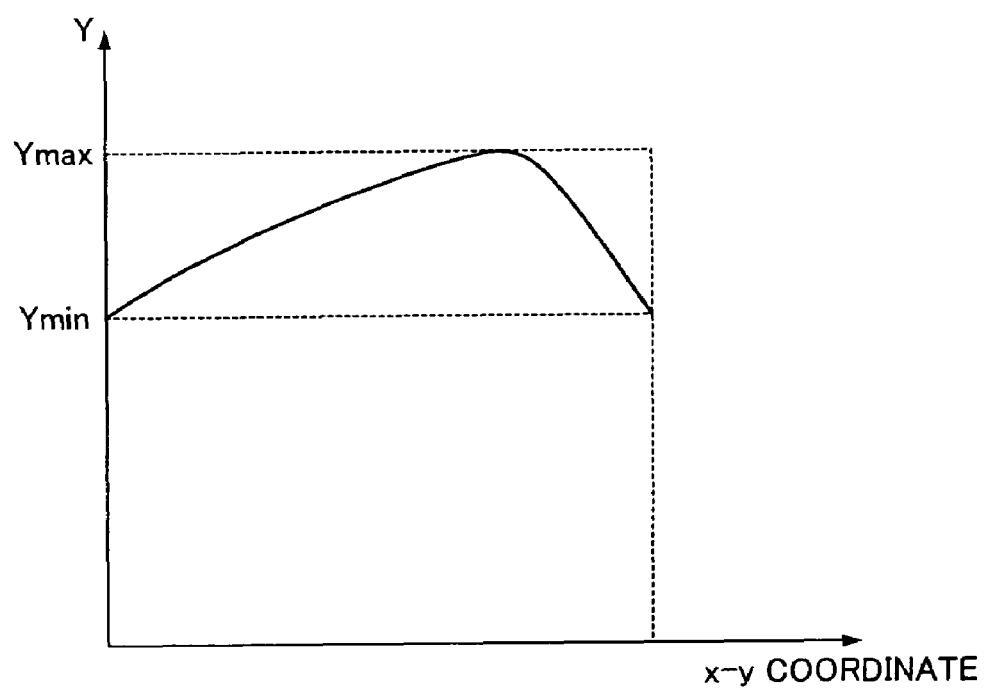
FIG. 8 is a graph schematically showing another luminance distribution in an image before correction.

FIG. 8 is a graph schematically showing another luminance distribution in an image before correction.

For example, if the projector 20 is disposed rightward and slantwise relative to the screen region 10 and an image has the maximum luminance value at its right center position, the maximum luminance values can be reduced to equalize the luminance distribution in the image by maximizing the correction amount at the right center position as shown in FIG. 8.

Although this embodiment has been described as to the luminance value of the image regulated depending on user's instruction, the projector 20 may further have a luminance measuring section for measuring the luminance value in the image and outputting luminance information.

In this case, the luminance regulating section 120 will regulate the luminance value based on the correction table as well as the luminance information from the luminance measuring section. Thus, the projector 20 can output an image adapted to the viewing environment by actually measuring the luminance value in the displayed image and regulating the luminance value according to the measured value.

Such a luminance measuring section may be in the form of CCD sensor or CMOS sensor, for example. It is of course that the luminance regulating section 120 may regulate the luminance value in the image based on both the luminance information and user's instruction.

Furthermore, the projector 20 may periodically measures the luminance value and update the correction table based on the luminance information.

Thus, the projector 20 can regulate the luminance distribution more precisely.

Moreover, an image may be divided into plural regions, for each of which a correction table is provided.

For accommodating the deterioration with time in the light source 196 and the like, the projector 20 may further be provided with a timer or the like, and uses a correction table for taking the deterioration with time in the light source 196 and the like may be provided.

Thus, the projector 20 can receive the deterioration with time in the light source 196 and the like, thereby more accurately regulating the luminance distribution.

Although the embodiment has been described as to the projector 20 which may be used as an image processing system, the present invention is also effective for any image processing system using one of various other light sources such as a cathode ray tube (CRT), a light emitting diode (LED) and the like, rather than the projector 20.

Additionally, the projector 20 may be in the form of a liquid crystal projector, a projector using a digital micromirror device (DMD) or the like, for example. DMD is a trademark possessed by the U.S. Texas Instruments.

The functions of the projector 20 may be accomplished solely by the projector 20 or by a plurality of decentralized processing units (e.g., one projector and one PC).

What is claimed is:

1. An image processing system comprising:
   signal input section which inputs an image signal;
   luminance regulating section which regulates a luminance value of an image by correcting the inputted image signal;
   signal output section which outputs the corrected image signal; and
   luminance measurement section which measures a luminance value of an image and outputting luminance information,
   wherein the luminance regulating section corrects the image signal to equalize luminance values in central and marginal portions of an image when the luminance value in the central portion is higher than the luminance value in the marginal portion, based on the luminance information and a correction table showing the relationship between a correction amount and a position in an image, and
   wherein the correction table includes data showing the correction amount based on a value obtained by dividing a differential value between a darkroom reference luminance value at a given position in an image and the minimum luminance value of the image by a differential value between the maximum and minimum luminance values of the image.

2. The image processing system as defined in claim 1,
   wherein the correction amount is obtained by: {(the darkroom reference luminance value−the minimum luminance value)/the darkroom reference luminance value}/{(the maximum luminance value−the minimum luminance value)/the maximum luminance value}.

3. An image processing system comprising:
   signal input section which inputs an image signal;
   luminance regulating section which regulates a luminance value of an image by correcting the inputted image signal;
   signal output section which outputs the corrected image signal; and
   instruction input section which inputs instruction information which represents a correction instruction from a user,
   wherein the luminance regulating section corrects the image signal to equalize luminance values in central and marginal portions of an image when the luminance value in the central portion is higher than the luminance value in the marginal portion, based on the instruction information and a correction table showing the relationship between a correction amount and a position in an image, and
   wherein the correction table includes data showing the correction amount based on a value obtained by dividing a differential value between a darkroom reference luminance value at a given position in an image and the minimum luminance value of the image by a differential value between the maximum and minimum luminance values of the image.

4. A projector comprising:
   signal input section which inputs an image signal;
   luminance regulating section which regulates a luminance value of an image by correcting the inputted image signal;
   signal output section which outputs the corrected image signal;

luminance measurement section which measures a luminance value of an image and outputting luminance information; and image projecting section which projects an image based on the image signal output from the signal output section, wherein the luminance regulating section corrects the image signal to equalize luminance values in central and marginal portions of an image when the luminance value in the central portion is higher than the luminance value in the marginal portion, based on the luminance information and a correction table showing the relationship between a correction amount and a position in an image, and wherein the correction table includes data showing the correction amount based on a value obtained by dividing a differential value between a darkroom reference luminance value at a given position in an image and the minimum luminance value of the image by a differential value between the maximum and minimum luminance values of the image.

5. A projector comprising:

signal input section which inputs an image signal;

luminance regulating section which regulates a luminance value of an image by correcting the inputted image signal;

signal output section which outputs the corrected image signal;

instruction input section which inputs instruction information which represents a correction instruction from a user; and image projecting section which projects an image based on the image signal output from the signal output section, wherein the luminance regulating section corrects the image signal to equalize luminance values in central and marginal portions of an image when the luminance value in the central portion is higher than the luminance value in the marginal portion, based on the instruction information and a correction table showing the relationship between a correction amount and a position in an image, and wherein the correction table includes data showing the correction amount based on a value obtained by dividing a differential value between a darkroom reference luminance value at a given position in an image and the minimum luminance value of the image by a differential value between the maximum and minimum luminance values of the image.

6. A computer-readable medium which stores a program causing a computer to function as:

signal input section which inputs an image signal;

luminance regulating section which regulates a luminance value of an image by correcting the inputted image signal;

signal output section which outputs the corrected image signal; and instruction input section which inputs instruction information which represents a correction instruction from a user, wherein the luminance regulating section corrects the image signal to lower a luminance value in a central portion of an image when uniformity improvement of luminance values in central and marginal portions of the image is instructed, or corrects the image signal to lower a luminance value in a marginal portion of an image when emphasis of a central portion of the image is instructed, based on the instruction information and a correction table showing the relationship between a correction amount and a position in an image, and wherein the correction table includes data showing the correction amount based on a value obtained by dividing a differential value between a darkroom reference luminance value at a given position in an image and the minimum luminance value of the image by a differential value between the maximum and minimum luminance values of the image.

7. A computer-readable medium which stores a program causing a computer to function as:

signal input section which inputs an image signal;

luminance regulating section which regulates a luminance value of an image by correcting the inputted image signal;

signal output section which outputs the corrected image signal; and luminance measurement section which measures a luminance value of an image and outputting luminance information, wherein the luminance regulating section corrects the image signal to equalize luminance values in central and marginal portions of an image when the luminance value in the central portion is higher than the luminance value in the marginal portion, based on the luminance information and a correction table showing the relationship between a correction amount and a position in an image, and wherein the correction table includes data showing the correction amount based on a value obtained by dividing a differential value between a darkroom reference luminance value at a given position in an image and the minimum luminance value of the image by a differential value between the maximum and minimum luminance values of the image.

8. An image processing method comprising:

inputting instruction information representing a correction instruction from a user;

inputting an image signal;

correcting the image signal to lower a luminance value in a central portion of an image when uniformity improvement of luminance values in central and marginal portions of the image is instructed, or correcting the image signal to lower a luminance value in a marginal portion of an image when emphasis of the central portion of the image is instructed, based on the instruction information and a correction table showing the relationship between a correction amount and a position in an image; and outputting the corrected image signal, wherein the correction table includes data showing the correction amount based on a value obtained by dividing a differential value between a darkroom reference luminance value at a given position in an image and the minimum luminance value of the image by a differential value between the maximum and minimum luminance values of the image.

9. An image processing method comprising:

measuring a luminance value of a displayed image and outputting luminance information;

inputting an image signal;

correcting the image signal to equalize luminance values in central and marginal portions of an image when the luminance value in the central portion is higher than the luminance value in the marginal portion, based on the luminance information and a correction table showing the relationship between a correction amount and a position in an image; and outputting the corrected image signal, wherein the correction table includes data showing the correction amount based on a value obtained by dividing a differential value between a darkroom reference luminance value at a given position in an image and the minimum luminance value of the image by a differential value between the maximum and minimum luminance values of the image.

* * * * *